Figure 8:
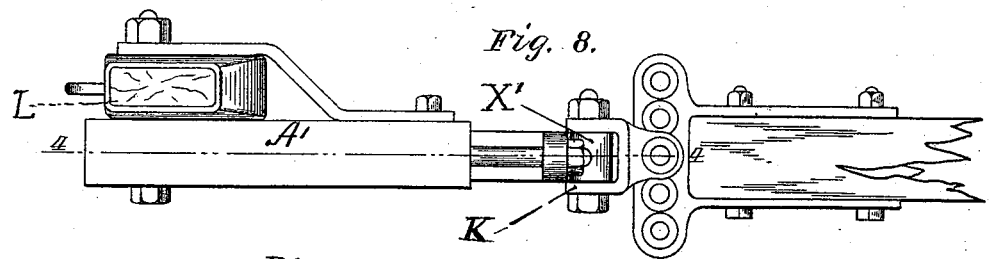

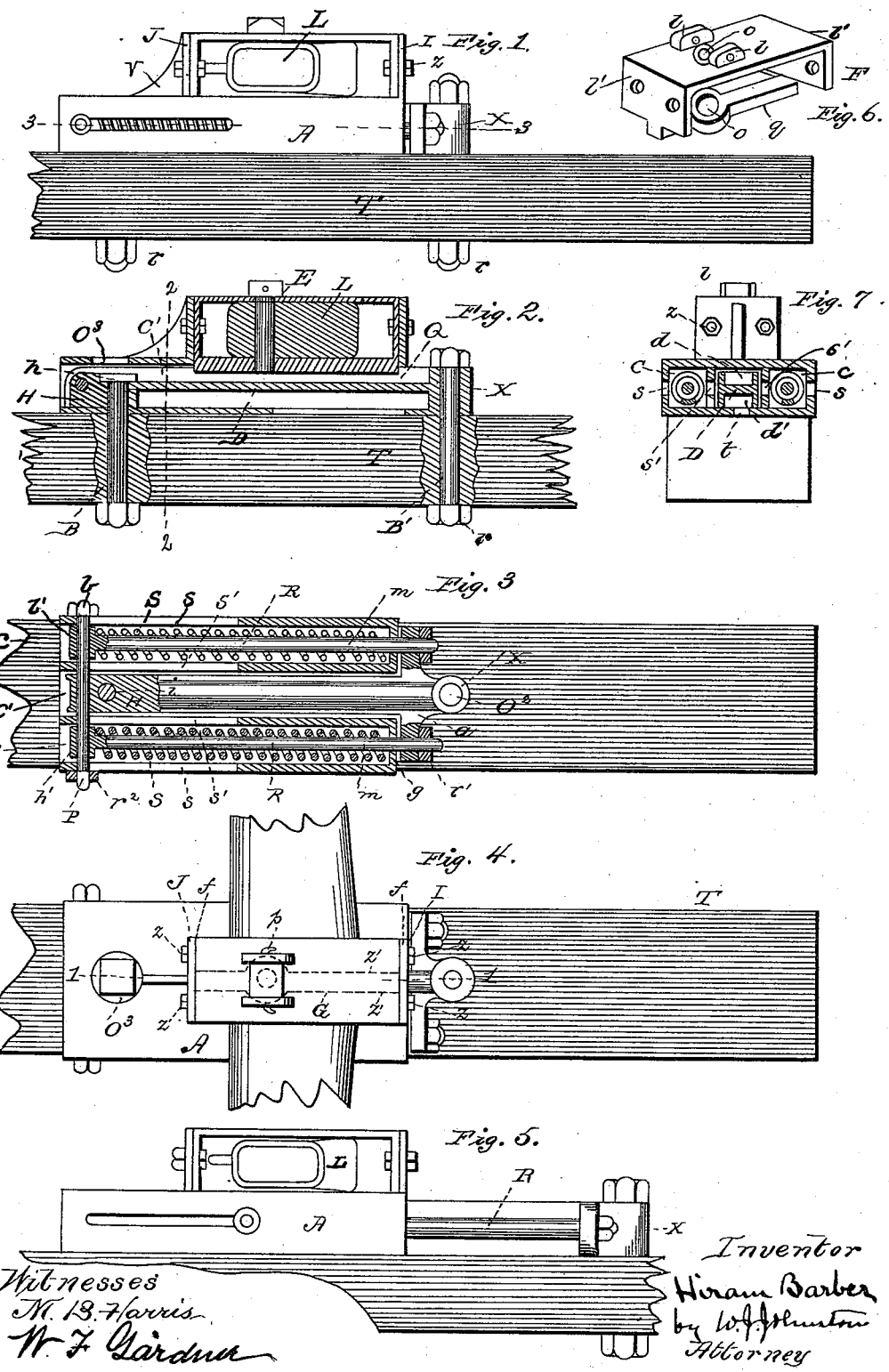

(No Model.)  3 Sheets—Sheet 2.

H. BARBER.
SPRING DRAFT ATTACHMENT FOR VEHICLES.

No. 451,968. Patented May 12, 1891.

Witnesses:
C. W. Davenport
Barbara Schotter

Inventor:
Hiram Barber (No Model.) 3 Sheets—Sheet 3.

H. BARBER.
SPRING DRAFT ATTACHMENT FOR VEHICLES.

No. 451,968. Patented May 12, 1891.

Witnesses:
C. W. Davenport
Barbara Schottler

Inventor:
Hiram Barber

UNITED STATES PATENT OFFICE.

HIRAM BARBER, OF CHICAGO, ILLINOIS.

SPRING-DRAFT ATTACHMENT FOR VEHICLES.

SPECIFICATION forming part of Letters Patent No. 451,968, dated May 12, 1891.

Application filed August 31, 1888. Serial No. 284,254. (No model.)

*To all whom it may concern:*

Be it known that I, HIRAM BARBER, a citizen of the United States, residing at Chicago, in the county of Cook and State of Illinois, have invented a certain new and useful Improvement in Spring-Draft Attachments for Wagons and other Vehicles, of which the following is a full, clear, concise, and exact description, reference being had to the accompanying drawings, forming a part of this specification.

My invention relates to spring-draft attachments for wagons, plows, harrows, and other vehicles or implements of industry, and is designed especially to secure a yielding connection between the evener and the fixed point of draft of a wagon or other vehicle by a device inexpensive in cost of manufacture, easily and readily attached to or detached from the wagon or vehicle, and efficient in operation. The advantages of a yielding connection between the evener and the fixed point of draft on a wagon or other vehicle are now very generally recognized by those who have given thought and attention to the subject. Such a connection gives at once the greatest relief to the draft-animal from the jolts and shocks incident to heavy draft over rough and uneven surfaces and at the same time largely diminishes the amount of the wear and tear of the vehicle and harness without any known loss of power or disadvantage. Several very excellent devices have been hitherto in use; but none has yet been found which appears to meet the unqualified approval of the public.

In one form of attachment now in use a metallic case containing a coil-spring which operates in front of the evener is permanently attached to the pole or other fixed point of draft of a wagon and is not susceptible of detached use. In another form of attachment a leaf-spring operating longitudinally in the rear of and in combination with the evener is permanently attached thereto. This form of device as hitherto constructed is too cumbersome for detached use.

In my invention herein described I have sought to produce a device which may be readily attached to or detached from the wagon or other vehicle, and which is not too cumbersome for use in conjunction with the evener, when so detached, and which is efficient in operation in both cases, and which is also inexpensive in the cost of production. The combination of these qualities in one device or apparatus is manifestly the one imperative condition upon which the prompt and general adoption by the public of a spring-draft attachment depends.

Figure 9:
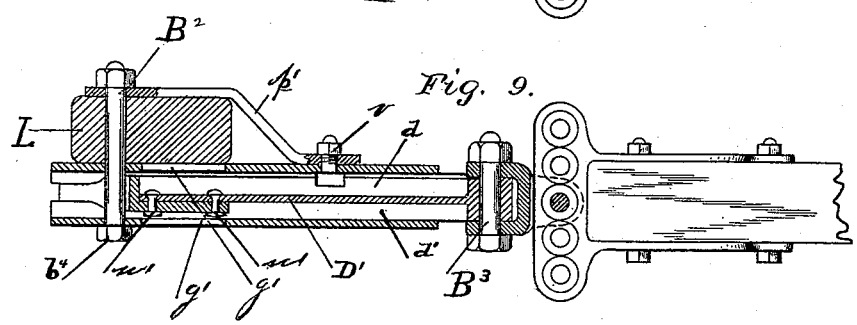
Figure 10:
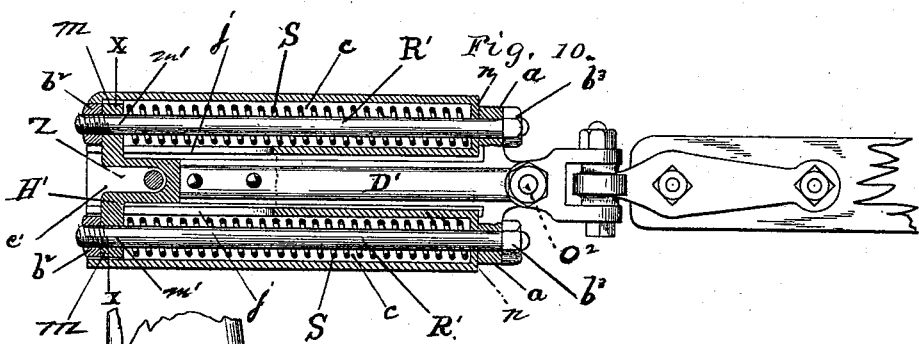
Figure 11:
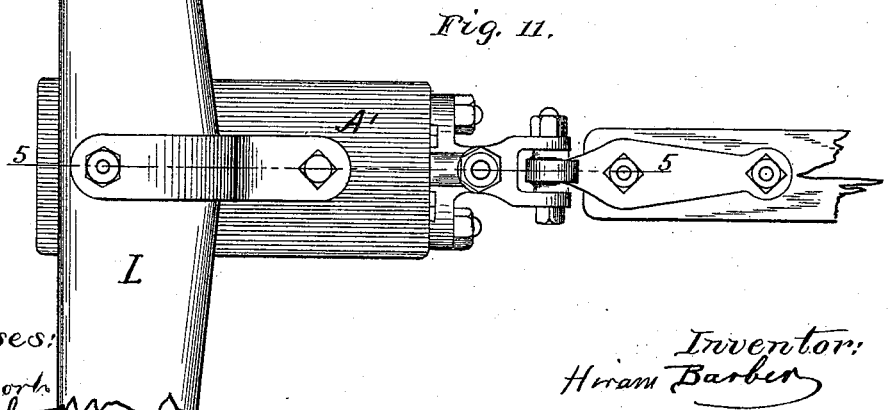
Figure 12:
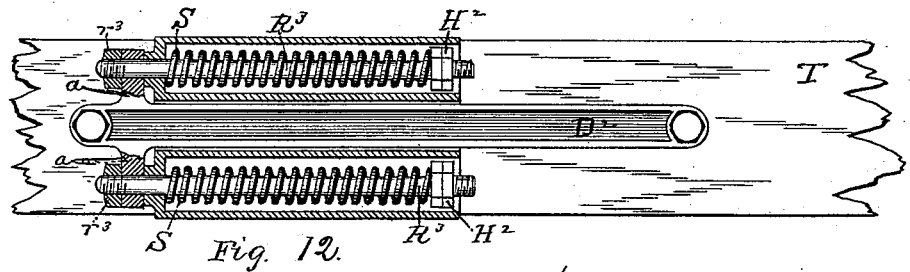
Figure 13:
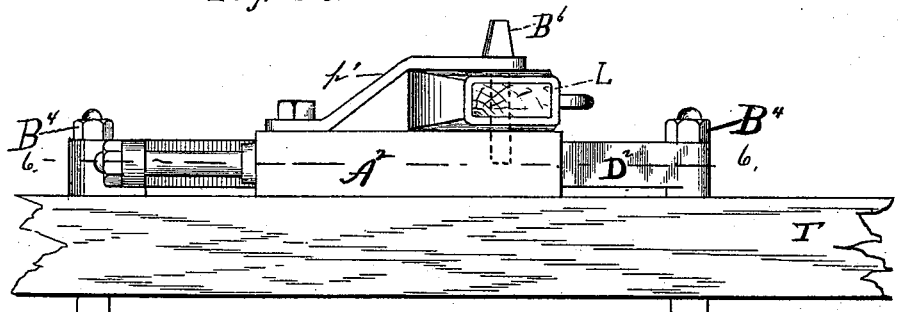
Figure 14:
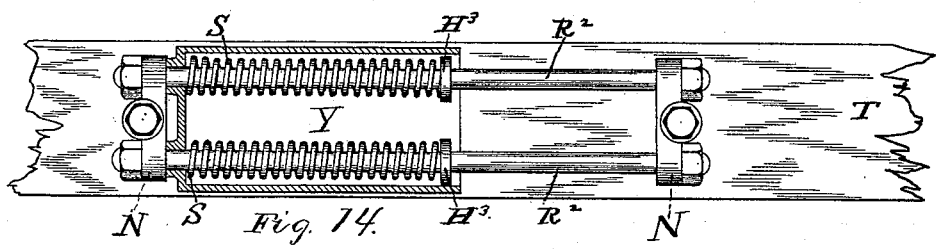
Figure 15:
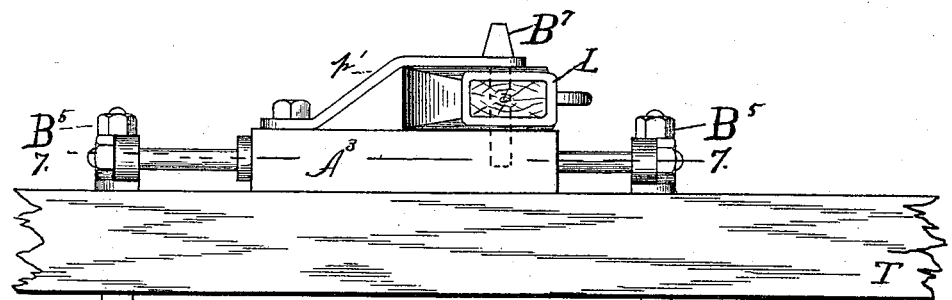
Figure 16:
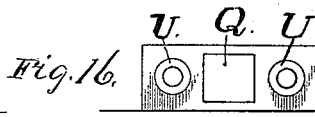
Figure 17:
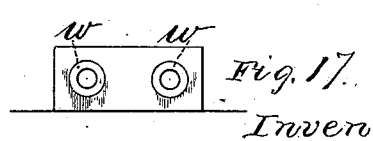

Of the drawings accompanying this application, Figure 1 is a side elevation illustrating the preferable form of my spring-draft attachment for use on wagons and showing the same in position on the pole T with the evener L in place. Fig. 2 is a sectional view of Fig. 1 on the dotted line 1 1, showing the manner of connecting the case A with the pole T and with the evener L. Fig. 3 is a sectional view of Fig. 1 on the dotted line 3 3, showing the interior of the lower half of the case A and the position of the draw-bar D, the springs S S, the rods R R, and the bolt P when the case A is at rest and the springs S S are extended. Fig. 4 is a plan view of the preferable form of my spring-draft attachment when attached to the pole T with the evener L in place and the springs S S expanded, the dotted lines Z' Z' showing the slot G in the upper part of the case A for the reception of the lower member q of the frame F when the same is attached to the case A. Fig. 5 is a side elevation of the preferable form of my spring-draft attachment affixed to the pole T with the springs S S compressed. Fig. 6 is a perspective view of the frame F, in which the evener L is held and works, and by means of which the evener L is firmly attached to the case A in the preferable form of my spring-draft attachment. Fig. 7 is a sectional view of my spring-draft attachment in its preferable form on the dotted line 2 2. Fig. 8 is a side elevation of the first modified form of my spring-draft attachment for use on plows and harrows with the evener L in place and the springs S S partially compressed. Fig. 9 is a sectional view of the first modified form of my spring-draft attachment on the dotted line 5 5, showing the connection of the evener L with the case A and also the manner of uniting the head H' and the shaft of the draw-bar D' as constructed for use in this modified form of my spring-draft attachment. Fig. 10 is a sectional view on the dotted line 4 4 of the first modified form of my spring-draft attachment. Fig. 11 is a plan view of the first modified form of my spring-draft attachment. Fig. 12 is a sectional view of the second modified form of my spring-draft attachment on the dotted lines 6 6 of Fig. 13. Fig. 13 is a side elevation of the second modified form of my spring-draft attachment, showing the shaft of the draw-bar $D^2$ extended forward and attached to the pole T in front of the case. Fig. 14 is a sectional view of the third modified form of my spring-draft attachment on the dotted line 7 7 of Fig. 15, showing the lower part of the case $A^4$ and the draft-rods $R^2$ $R^2$ extended in front of the case $A^4$ and attached to the pole T. Fig. 15 is a side elevation of the third modified form of my spring-draft attachment. Fig. 16 is a view of the rear end of the cases A, A', and $A^2$, showing the opening Q in the central chamber $c'$ and the openings U U in the rear end of the lateral chambers $c$ $c$. Fig. 17 is a view of the rear end of the case $A^3$, showing the openings $w$ $w$ for the passage of the draft-rods $R^2$ $R^2$.

I will now more particularly describe the preferable form of my spring-draft attachment for use on wagons or other vehicles, as illustrated in Figs. 1, 2, 3, 4, 5, 6, and 7.

In the preferable form of my spring-draft attachment, as described herein, the interior of the metallic case A is divided longitudinally into the three rectangular chambers $c$ $c'$ $c$. The lateral or side chambers $c$ $c$ contain the coil-springs S S upon the rods R R, which rods are connected at the front with the draw-bar D by means of the bolt P and at the rear by means of the arms $a$ $a$ of the draw-bar D. The head H and main shaft of the draw-bar D occupy the central chamber $c'$ of the case A. The draw-bar D is attached to the pole T by means of the bolts B B'. The bolt B passes through the perpendicular hole $i$ in the head H, and also through the forward end of the slot $t$ in the bottom of the central chamber $c'$, and also through the pole T. In like manner the bolt B' passes through the hole $O^2$ in the head X of the draw-bar D, and also through the pole T. The bolt B is inserted from above through the opening $O^3$ in the top of the case A, and when in position is so adjusted as to permit the forward longitudinal motion of the case A, the head $h$ thereof resting upon the upper surface of the head H of the draw-bar D and lying wholly within the walls of the central chamber $c'$ of the case A. The rods R R are provided with the heads $h'$ $h'$ to receive the pressure of the coil-springs S S. The heads $h'$ $h'$ are perforated horizontally for the passage of the bolt P.

The walls of the chambers $c$ $c'$ $c$ of the case A are provided with the longitudinal slots $s$ $s'$ $s'$ $s$, in which the bolt P moves when the case A advances upon the draw-bar D. The stems $m$ $m$ of the rods R R pass through the apertures U U, provided therefor in the rear ends $g$ $g$ of the lateral chambers $c$ $c$ of the case A and also through corresponding apertures in the ends of the arms $a$ $a$ of the draw-bar D, and are secured in place by the burrs $r'$ $r'$. The rear end of the central chamber $c'$ of the case A is provided with the opening Q to receive the head H and shaft of the draw-bar D. By this arrangement, when the preferable form of my spring-draft attachment is in operation upon the pole T of a wagon, the draw-bar D is immovable longitudinally, the same being held in position by the bolts B and B', which are secured below by the burrs $r$ $r$. When, therefore, forward pressure is applied to the metallic case A, the coil-springs S S are compressed upon the rods R R by the ends $g$ $g$ of the lateral chambers $c$ $c$, while the forward movement of the springs S S is arrested by the heads $h'$ $h'$ of the rods R R, supported at the rear of the case A by the arms $a$ $a$ of the draw-bar D and at the front by the bolt P, which connect the heads $h'$ $h'$ with the head H of the draw-bar D, and thus the resistance of the springs S S is distributed upon and is borne by the bolt P, the rods R R, the arms $a$ $a$, and the main shaft of the draw-bar D, while, by reason of the longitudinal slots $s$ $s'$ $s'$ $s$ in the walls of the chambers $c$ $c'$ $c$ and the longitudinal slot $t$ in the bottom of the central chamber $c'$, neither the bolt P nor the bolt B offers any resistance to the forward longitudinal movement of the case A upon the draw-bar D, and the same may be advanced until the coil-springs S S are fully compressed, and when the evener L is attached to the case A the yielding connection between it and the fixed point of draft is secured.

In the preferable form of my spring-draft attachment, as described herein, the evener L is mounted on the case A in the rectangular frame F, which is attached to the case A by means of the two upright plates J I, which are attached to and projected from the upper surface of the case A at right angles and parallel to each other. The plate J is supported in front by the brace V. When in position, the lower member $q$ of the frame F occupies the longitudinal slot G in the upper part of the case A, while the exterior faces of the ends $l'$ $l'$ thereof are in close contact with the opposite faces $f$ $f$ of the plates J I, and are firmly attached thereto by means of the bolts $z$ $z$ $z$ $z$. The upper and lower members of the frame F are provided with the apertures O O for the reception of the bolt E, which passes through the evener L. The bolt E is held in place by the pin $p$, which passes through an aperture in the head thereof, and also through corresponding apertures in the lugs $l$ $l$ upon the upper member of the frame F.

In the preferable form of my spring-draft attachment the upper surface of the shaft of the draw-bar D is provided with the longitudinal recess $d$, while the lower surfaces of the shaft and of the head H of such draw-bar are provided with the corresponding longitudinal recess $d'$. The upper part of the rear portion of the head H is a plain surface. The height of the head H is such as to permit the head of the bolt B, when resting thereon, to lie wholly within the upper part of the central chamber $c'$ of the case A, while the forward part of the head H is raised sufficiently to permit its perforation horizontally for the passage of the bolt P. The bolt P is held in position by its head $b$ and the burr $r^2$. The exterior chambers $c\ c$ of the case A are preferably open in front for the insertion of the rods R R and the coil-springs S S.

Having thus fully described in detail the preferable form of my spring-draft attachment, I will now proceed to explain the modifications thereof, as illustrated in Figs. 8, 9, 10, 11, 12, 13, 14, and 15.

In the first modified form of my spring-draft attachment described herein the evener L is mounted upon the case A', where it is held in place by and works upon the bolt $B^2$, which passes through corresponding apertures provided therefor in the upper and lower parts of the central chamber $c'$ of the case A', and is held in place by the burr $b^4$. The bolt $B^2$ is supported at the top by the strap $p'$, which is provided with an aperture for the passage of the bolt $B^2$ at the front, while the rear end thereof is attached to the upper surface of the case A' by the bolt $v$. The draw-bar D' is provided with the head H', having the perpendicular longitudinal recess Z, open in front, and connected with the rods R' R' by means of the arms $m\ m$. The shafts of the arms $m\ m$ are flattened upon a horizontal line to conform to the longitudinal slots $j\ j$, while the ends thereof are provided with the apertures U U for the passage of the stems $m'\ m'$ of the rods R' R'. The ends $n\ n$ of the lateral chamber $c\ c$ in the case A' are identical with the ends $g\ g$ of the case A. The head H of the draw-bar D' is constructed separately from the shaft of the draw-bar D', and is united to such shaft in the central chamber $c'$ of the case A' by means of the bolts $n'\ n'$. The upper and lower parts of the central chamber $c'$ of the case A' are provided with the slots $g'\ g'$ to facilitate the insertion of the bolts $n'\ n'$. The slots $j\ j$ and the longitudinal chambers $c\ c'\ c$ of the case A' are open in front to permit the convenient insertion of the coil-springs S S, the head H', and the arms $m\ m$ thereof, and the rods R' R'. The rods R' R' are provided in front with the burrs $b^2\ b^2$ to resist the pressure of the coil-springs S S upon the arms $m\ m$. At the rear the stems of the rods R' R' pass through the apertures U U in the ends $n\ n$ of the lateral chambers $c\ c$ of the case A', and also through corresponding apertures in the arms $a'\ a'$ of the draw-bar D', and are fastened by means of the burrs $b^3\ b^3$. The rear end of the central chamber $c'$ of the case A' is also provided with the opening Q for the introduction of the shaft of the draw-bar D'. The shaft of the draw-bar D' is also provided with the longitudinal recesses $d\ d'$ in the upper and lower surfaces thereof. When the first modified form of my spring-draft attachment is in operation upon a plow or harrow, it is attached thereto by means of the head X' of the draw-bar D', which is provided with the aperture $O^2$. The bolt $B^3$, passing through the eyes of the clevis K and the aperture $O^2$ in the head X', the draw-bar D' becomes immovable longitudinally, and upon the application of forward pressure to the evener L the coil-springs S S are compressed upon the rods R' R' and the case A' advanced upon the draw-bar D' in the same manner as in the preferable form of my spring-draft attachment, the bolt $B^2$, by reason of the open recess Z in the head H', offering no resistance to the forward movement of the case A'.

In the second modified form of my spring-draft attachment (shown in Figs. 12 and 13) the shaft of the draw-bar $D^2$ is extended forward and attached to the pole of the vehicle at a sufficient distance in front of the case to permit the desired amount of forward longitudinal movement of the case when the springs S S are compressed.

The shaft of the draw-bar $D^2$ has no connection with the draft-rods $R^3\ R^3$ within the case. The evener L is mounted upon the upper surface of the case $A^2$, when it is held in position by the bolt $B^6$ and the strap $p'$.

In the third modified form of my spring-draft attachment (shown in Figs. 14 and 15) the draft-rods $R^2\ R^2$ are extended forward and are attached to the pole of the vehicle at a sufficient distance in front of the case to permit the desired amount of forward longitudinal movement of the same when the springs S S are compressed against the stops $H^3\ H^3$, which are immovable on the rods $R^2\ R^2$. The rods $R^2\ R^2$ are held in position on the pole T by the blocks N N and the bolts $B^5\ B^5$. The evener L is also mounted upon the upper surface of the case $A^3$, where it is held in position by the strap $p'$ and the bolt $B^7$, the lower part of which bolt passes down into the space between the springs S S in the chamber Y.

It is obvious that in the different forms of the spring-draft attachment herein described the structure of the cases A, A', $A^2$, and $A^3$ may be varied without changing the essential character of the device. Thus, for example, the outside lateral walls of the lateral chambers $c\ c$ may be dispensed with and the walls of the central chamber $c'$ left as the longitudinal support between the upper and lower parts of the case A. On the other hand, the walls of the central chamber $c'$ may be dispensed with and the outside lateral walls of the lateral chambers $c\ c$ relied upon as the main support between the upper and lower parts of the case A. So also a variety of methods may be adopted in mounting the evener L on the cases. I do not therefore wish to be limited to the precise forms here given in the structure of the cases, since the same may undoubtedly become objects of separate manufacture; nor do I wish to be confined to the precise manner of mounting the evener upon the cases.

Having thus fully described the purpose, mode of construction, and method of operation of my spring-draft attachment, what I claim as my invention, and for which I desire to secure Letters Patent, is fully set forth in detail in the following claims:

1. In a spring-draft attachment for vehicles, the combination, with the tongue thereof, of a metallic casing and draw-bar carried thereby, the said casing divided into longitudinal compartments, and the evener-bar mounted upon and connected with the upper face of the casing by a bolt, substantially as described.

2. In a spring-draft attachment for vehicles, the combination, with the tongue thereof, of a metallic casing divided into chambers, the draw-bar occupying the central chamber, the coil-springs surrounding the bolts R in the side chambers, and the evener-bar mounted upon and connected to the upper face of the casing by a bolt, substantially as described.

3. In a spring-draft attachment for vehicles, the combination, with the tongue thereof, of a metallic casing secured thereto, provided with openings, the longitudinally-moving draw-bar, and the draft-rods at each side of said bar, and the evener mounted upon and secured to the upper face of the casing, substantially as described.

4. In a spring-draft attachment for vehicles, the combination, with the tongue thereof, of an oblong metallic casing divided into compartments carried thereby, and the evener mounted upon the upper surface thereof and held in position by a bolt passing downwardly through an opening in the casing into the central compartment, substantially as described.

5. In a spring-draft attachment for vehicles, the combination, with the tongue thereof and the metallic casing divided into three longitudinal compartments, of the draft-bars located in the side chambers, surrounded by coiled springs, and the evener upon the upper surface of the casing, held thereon by a bolt passing through an opening down into the casing between the draft-rods, substantially as described.

6. In a spring-draft attachment for vehicles, the combination, with the tongue thereof, of the metallic casing provided with a chamber Y, the openings $w\ w$ in the rear end wall thereof, and the evener mounted upon the casing and held in position thereon by an evener-bolt, the lower portion entering the central longitudinal chamber, substantially as described.

7. In a spring-draft attachment for vehicles, the combination, with the tongue thereof, of a metallic casing carried thereby, having a central draw-bar, a coil-spring at each side of said bar surrounding rods provided with heads, and a transverse connecting-bolt to which the head of the draw-bar and the heads of the rods are attached, substantially as described.

8. In a spring-draft attachment for vehicles, the combination, with the tongue thereof, of a metallic casing divided into three longitudinal chambers, the coil-springs surrounding the draft-rods in the side chambers, and the draw-rod provided with arms formed at right angles thereto having bearings for the draft-rods, substantially as described.

9. In a spring-draft attachment for vehicles, the combination, with the tongue thereof, of a metallic casing carried thereby divided into three compartments, the slots $L'$, $s'$, and $t$, and the opening U Q U in said casing, the coil-springs S S, surrounding the draft-rods in the side chambers, and the evener upon the casing and connected thereto by a bolt passing downwardly into the central chamber, substantially as described.

In witness whereof I hereunto subscribe my name this 6th day of August, A. D. 1888.

HIRAM BARBER.

Witnesses:
SHERMAN BARBER,
BARBARA SCHOTTLER.